Oct. 25, 1932.   O. BAUR   1,883,866
SPRING LOADED VALVE
Filed July 19, 1929
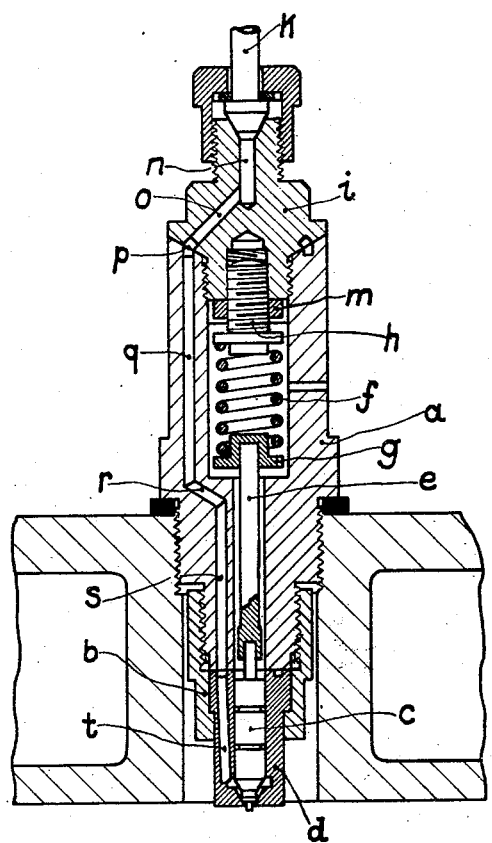

Patented Oct. 25, 1932

1,883,866

UNITED STATES PATENT OFFICE

OTTMAR BAUR, OF STUTTGART, GERMANY, ASSIGNOR TO ROBERT BOSCH AKTIEN-GESELLSCHAFT, OF STUTTGART, GERMANY

SPRING LOADED VALVE

Application filed July 19, 1929, Serial No. 379,479, and in Germany October 19, 1928.

The present invention relates to spring loaded valves and is particularly applicable to fuel valves or jet valves for internal combustion engines.

An object of the invention is to devise a spring loaded valve of unitary structure which may be readily screwed directly into the engine.

A further object is to devise a valve structure to be screwed directly into the engine and in which the supply pipe is attached to the valve by a nipple co-axially with the screw axis of the valve housing.

Another object of the invention is to devise a valve structure having a novel arrangement of ducts for supplying fuel to the valve nozzle.

According to the present invention a valve housing having a valve seat at one end has a duct in the wall thereof communicating with the seat whilst a nipple closing the other end thereof and adapted for abutment with a spring enclosed by said housing has a duct formed therein communicating with the duct in said housing and with a pipe connection secured externally thereto.

Preferably an abutment for the spring is screw threaded into the nipple and a lock nut is provided for securing the abutment in position relative to the nipple. A simple jet holder particularly well adapted for direct screwing into the engine cylinder is thus obtained.

One form of construction of the invention as applied to a jet or fuel valve is shown in longitudinal section in the accompanying drawing.

A jet member $d$ receiving the jet needle $c$ is held against the lower end of a housing $a$ by means of a screw cap $b$. One end of a pressure bar or spindle $e$ bears against the end of the jet needle nearest the housing whilst the other end carries a spring plate $g$ forming an abutment for a spring $f$. The second abutment for the spring $f$ is formed by a screw $h$ screwed into a nipple $i$ and to which an injection pipe $k$ coming from an injection pump which is not shown is connected co-axially with the axis of the housing. The screw $h$ carries a lock-nut $m$, and can only be moved after screwing out the nipple $i$. The tension of the closing spring cannot therefore be altered during running.

The fuel entering the nipple $i$ at $n$ is led through an inclined passage $o$ and an annular groove $p$ in the conical tightly sealed seating between the nipple and the holder into a passage $q$ in the latter. It passes thence through the passages $r$ and $s$ in the holder into the passage $t$ in the jet. The annular groove $p$ provides a passage for connecting passages $o$ and $q$ regardless of the position which the passage $o$ may assume when the nipple $i$ is screwed into the housing $a$.

I claim:

1. A spring loaded valve comprising a housing having a valve seat formed at one end and a duct in the wall thereof communicating with said valve seat, a valve, a valve spring enclosed by said housing, and a nipple closing the other end of the housing and forming an abutment for the spring and having a duct passing therethrough communicating with the duct in the housing.

2. A spring loaded valve comprising a housing having a valve seat formed at one end and a duct in the wall thereof communicating with said valve seat, a valve, a valve spring enclosed by said housing, and a nipple closing the other end of the housing and forming an abutment for the spring and having a duct passing therethrough communicating with the duct in the housing, said housing and said nipple having annular grooves formed in their interengaging faces adapted to register with one another and communicating with the ducts formed in the wall of the housing and the nipple respectively.

3. A spring loaded valve comprising a housing having a valve seat formed at one end and a duct in the wall thereof communicating with said valve seat, a valve, a valve spring enclosed by said housing and a nipple closing the other end of the housing and forming an abutment for the spring and having a duct passing therethrough communicating with the duct in the housing and emerging coaxially of the nipple.

4. A spring loaded valve comprising a housing having a valve seat formed at one end and a duct in the wall thereof communicating with said valve seat, a valve, a valve spring enclosed by said housing, a nipple closing the other end of the housing and forming an abutment for the spring and having a duct passing therethrough communicating with the duct in the housing, and a pipe connection communicating with the duct in said nipple and arranged coaxially with the axis of the housing.

5. A spring loaded valve comprising a housing having a valve seat formed at one end and a duct in the wall thereof communicating with said valve seat, a valve spring enclosed by said housing, a nipple having a duct passing therethrough communicating with the duct in the housing and an adjustable abutment for the spring screw threaded into the nipple.

6. A spring loaded valve comprising a housing having a valve seat formed at one end and a duct in the wall thereof communicating with said valve seat, a valve spring enclosed by said housing, a nipple having a duct passing therethrough communicating with the duct in the housing, an adjustable abutment for the spring screw threaded into the nipple and a lock nut for securing said abutment in position relative to the nipple.

7. A spring loaded valve comprising a housing having a valve seat formed at one end and a duct in the wall thereof communicating with said valve seat, a nipple closing the other end of said housing and having a duct passing therethrough communicating with the duct in the housing, a valve, a valve spindle, a valve plate on said spindle, a valve spring enclosed by said housing and abutting at one end with said valve plate, and an adjustable abutment for the other end of said valve spring screw threaded into the nipple.

In testimony whereof I have hereunto affixed my signature.

OTTMAR BAUR.